Oct. 25, 1932.   F. T. SWAIN   1,884,368
GEAR TESTING MACHINE
Filed Oct. 28, 1926   2 Sheets-Sheet 1

Inventor
Francis T. Swain
By Hing Harness
Attorney

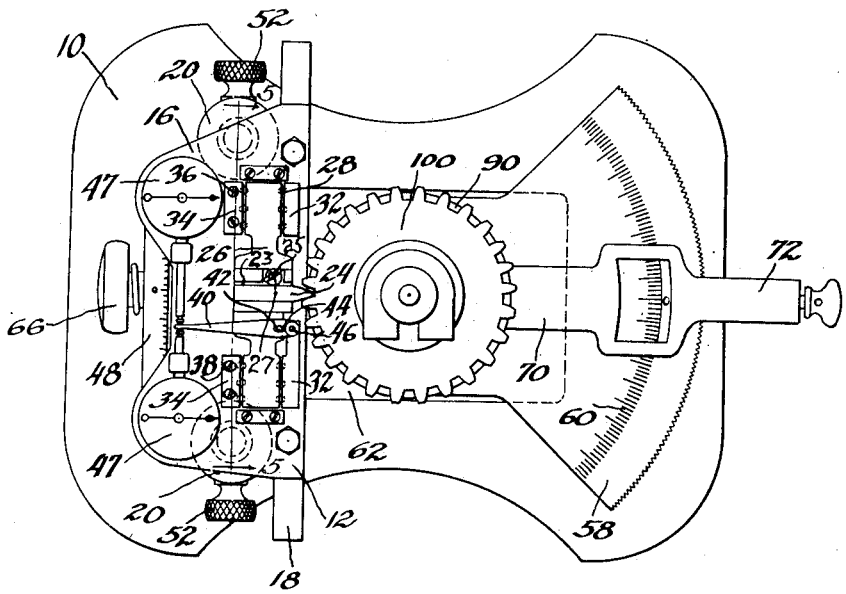

Patented Oct. 25, 1932

1,884,368

UNITED STATES PATENT OFFICE

FRANCIS T. SWAIN, OF NEWCASTLE, INDIANA

GEAR TESTING MACHINE

Application filed October 28, 1926. Serial No. 144,668.

This invention relates to a gear checking machine and more particularly to a machine for checking the inaccuracy of the involute curve of the bearing face of each gear tooth and to indicate the degree of that inaccuracy.

The principle employed in developing the involute curve for a gear tooth may be illustrated by placing a straight edge tangent to and in contact with a circle corresponding to the base circle of a gear. When the straight edge is rolled on the base circle, a given point on the tangent line will trace the involute curve for a tooth of a gear having that base circle. It has been found that by rotating a circle corresponding to the pitch diameter of a given gear and permitting the straight edge to move in a straight line tangent to that pitch diameter, a surface on the straight edge will have rolling contact with a true involute gear tooth, when the angle between the contact surface and a line perpendicular to the straight edge is equal to the pressure angle of the given gear. By mounting such an independently movable contact member on the straight edge, inaccuracies of the involute curve of a gear tooth to be tested will be indicated and measured by the relative movement between the straight edge and the independently movable contact member.

It is therefore an important object of this invention to check the inaccuracies of the involute curve by contacting the surface of an independently movable indicator, having a surface equal to the pressure angle of the tooth and horizontally moving the indicator tangent to the pitch diameter of the gear.

Another object of this invention is to rotate the gear with respect to the straight edge so that a reading may be taken for each degree of rotation, thus plotting a curve according to its true shape.

Another object is to work from the pitch diameter of the teeth so that the entire length of the curve may be checked, including the addendum and dedendum.

A further object is to provide a contact member carried by a sliding bar which has its sides formed with an angle equal to the pressure angle of the gear to be checked, adapted to engage the face of one tooth which may be considered as the coast side or the opposite face of an adjacent tooth, the drive side.

Means have been provided whereby the sliding bar may be raised or lowered to check any point over the entire width of the face. Cluster gears may be checked without changing their position and a machine provided with such a means permits the checking of gears having a long hub.

Other objects and advantages will more fully appear from the following description taken in connection with the accompanying drawings in which:

Fig. 3 is a plan view of the machine.

Fig. 4 is a sectional view showing in detail one of the adjustable rollers.

Fig. 5 is a sectional view taken on line 5—5 of Fig. 3.

Figure 1:
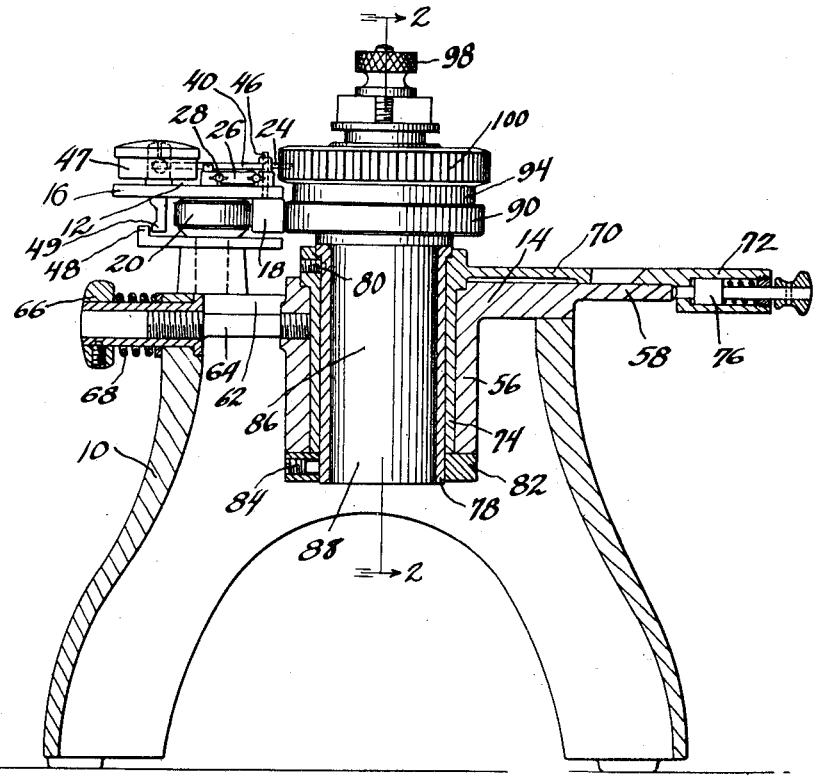
Fig. 1 is a sectional view through the machine showing a gear in position to be checked.
Figure 2:
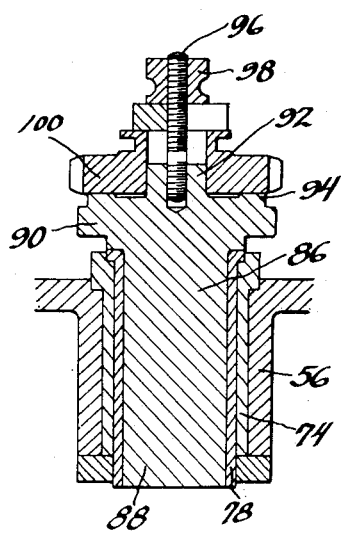
Fig. 2 is a sectional view taken on line 2—2 of Fig. 1.

Referring to the illustrated embodiment of my invention the machine is shown comprising a base portion 10, a slidable unit 12 carrying an indicating mechanism and a slidable gear support 14. The slidable unit 12 has a plate 16 to which the several parts are attached. A tangent bar or straight edge 18 is secured to the underside of the plate 16, adapted to engage a pair of rollers 20, supported in the base 10. The plate 16 rests on the upper surface of bearings 22 for the rollers 20 and is adapted to slide thereon as the bar 18 is laterally moved, hereinafter more fully described.

A contact member 24 is detachably secured to a plate 26 having independent movement with respect to the plate 16. A slot 23 in the plate 26 receives the contact member 24, and a screw 25, received in the plate 26, is provided with a cam portion 27, which when turned by the screw 25 in one direction frictionally holds the contact member 24 between the cam 27 and one side of the slot 23. When the screw and cam are turned in the opposite direction, the contact member is loose and may be moved from one position to another or replaced.

The plate 26 is supported at its opposite ends in lateral bearings. The bearings are formed by balls 28 in V shaped grooves 30 at the sides of the opposite end portions of the plate 26. A pair of supports 32 having V shaped grooves are rigidly secured to the plate 16 and the opposite pair 34 are detachably secured to the plate 16 by screws 36 loosely fitting apertures 38 in the supports 34. When the heads of the screws 36 are free from the upper surface of the supports 34, the supports may be moved toward or away from the plate 26, due to the body of the screws loosely fitting the apertures 38, for the purpose of adjusting the bearings 28. After the adjustment is made the screws are drawn down, the heads of which engage the upper surface of the supports 34, frictionally holding them between the plate 16 and the heads of the screws 36. Thus assembly of the plate 26 and balls 28 are permitted with an adjustment for the bearings.

The end of the contact member 24, adjacent the gear 100 to be checked, is formed similar to a straight rack tooth having its contacting faces formed at an angle equal to the pressure angle of the gear. When the gear is rotated, the face of the gear tooth rolls on the face of the straight surface of the contact member; the latter moving on a line tangent to the pitch diameter of the gear. Independent movement of the contact member is caused by inaccuracies on the face of the gear tooth. The inaccuracies are amplified and indicated for each angle of gear rotation.

Pivotally connected to the plate 16 is an arm 40 having a slot 42 engaging a pin 44 carried by the plate 26. The pin and slot are positioned with respect to the pivot point 46 in such a manner that any movement of the contact member 24 and plate 26 is transmitted to the arm 40, whereby the movement of the free end of the arm will be greatly amplified. A pair of dial micrometer gauges 47 are mounted on the plate 16 adapted to engage each side of the arm 40 at its free end.

In order that the bar 18 and contact member 24 may be centrally located and their lateral movement with respect to the base 10 measured, a graduated bar 48 has been secured to the base 10 and a pointer 49 adjacent the bar 48 is mounted on the plate 16 to move therewith. The graduations run from the center of the bar 48 in opposite directions and when the pointer 49 is directly over the central graduation on the bar 48 the bar 18 is centrally located on the base 10. As the bar 18 moves in either direction across the base 10, its movement may be measured by reading, on the graduated bar 48, the distance the pointer 49 has moved from the center location.

As shown in Fig. 4 the rollers 20 have been mounted on spindles 50 which fit openings in the base 10 and a set screw 52 engages a slot 54 formed in the spindle to lock the same and roller in one of several positions, thus permitting vertical adjustment of the slidable unit 12.

The gear support 14 comprises a slidable hub member 56 provided with an arc shaped portion 58 graduated in degrees as at 60 and adapted to slide in an opening 62 formed in the base 10. The opening 62 is provided with straight sides and the hub member 56 has straight sides which engage the sides of the opening 62 to permit longitudinal sliding movement of the hub with respect to the base 10 and to prevent turning of the hub. Opposite the arc shaped portion 58 is a screw threaded connection 64 having one end screw threaded into the hub 56 and its opposite end engaging a collar 66, slidably mounted in the base 10. A spring 68 resiliently urges the collar 66, rod 64 and hub 56 toward the bar 18 and rollers 20.

Journaled in the hub 56 and extending over the arc shaped portion 58 is an arm 70 provided with a handle portion 72 at its outer end and a cylindrical hub portion 74 fitting the hub 56. A spring pressed plunger 76 in the handle 72 engages one of a plurality of notches in radial alignment with each degree marking 60. A sleeve 78 is secured in the hub 74 by the set screw 80 and the two hubs 56 and 74 are held in assembled relation by a collar 82 at the lower end of the hubs and secured to the sleeve 78 as at 84.

An arbor 86 is provided with a shaft portion 88, an annular portion 90 corresponding to the pitch diameter of a gear to be checked, a portion 92 adapted to fit a central opening of the gear, a shoulder 94 forming a rest for the gear and a screw threaded extension 96 which receives a nut 98 to secure the gear in position. The shaft portion 88 tightly fits the sleeve 78 with the pitch diameter or roller 90 adjacent the bar 18. A gear tooth 100 is placed on the arbor 86 with the contact member 24 between two teeth of the gear. The collar 66 is turned, drawing the gear support 14 toward the indicating mechanism 12. When the roller 90 contacts with the bar 18 further turning of the collar 66 applies a tension on the spring 68, resiliently holding the bar 18 and indicating mechanism between the rollers 20 and the roller 90. The gear 100 is then rotated upon the hub 92 until one side of one tooth is in contact with the contact member 34. The dial micrometer gauges 47 are set at zero.

When the parts of the device are thus assembled and positioned, angular movement of the handle 72 in one direction causes rotation of the gear 100 and tangential movement of the bar 18 and contact member 24. The tangential movement of the bar 18, across the base 10, together with the angular movement of the roller 90, causes any point on the contact member to trace an involute curve on the angularly movable roller 90, the same as a curve traced by any point of a thread kept taut as it is wound upon, or unwound from, another curve. Due to the independent movement of the contact member 24, any inaccuracy in the face of the tooth will be indicated on one of the dials and by reversing the angular movement of the gear 100 inaccuracies of the opposite face on the adjacent tooth will be indicated on the other dial.

It will be understood that by rotating the gear 100 one degree at a time and taking a reading of the relative movement between the tangential movement of the contact member 24 and the bar 18 for each degree of gear rotation, a curve may be plotted on graph paper showing the difference of tangential movement of the contact member 24 moving with the bar 18 and the movement of the contact member 24 caused by the contact of its surface with the surface of the tooth; thus giving a permanent record of the inaccuracy of the tooth and a means for checking back to correct that inaccuracy.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In a gear checking mechanism having a base portion, rollers mounted thereon, a slidable unit laterally movable across said base and in contact with said rollers, said unit including a contactor having independent bodily movement with respect to the remainder of said unit in a direction parallel to the direction of movement thereof, means for supporting a gear to be checked on one of said rollers with the face of one of its teeth in contact with said contactor, means for rotating said roller, and means carried by said slidable unit for indicating the amount of relative movement between said contactor and the remainder of said slidable unit.

2. In a gear checking mechanism, a slidable unit including a contactor having independent bodily movement with respect to the remainder of said unit, means for supporting a gear to be checked with the face of one of its teeth in contact with said contactor, means for rotating said supporting means and moving said slidable unit on a tangent to the pitch circle of said gear, and means associated with said slidable unit for indicating the amount of relative movement between said contactor and the remainder of said slidable unit.

3. In a gear checking mechanism having means for supporting a gear, a contactor for engaging the face of one of the teeth of said gear, a support for said contactor, said contactor being transversely movable relative to said support, means for rotating said gear and moving said support on a line tangent to the pitch circle of said gear, and means for amplifying and indicating the amount of relative movement between said contactor and its support.

4. In a gear checking mechanism, a member movable tangentially with respect to the pitch circle of a gear to be checked, a contact member carried by said first mentioned member and guided for relative parallel movement with respect to the movement thereof, means for rotating the gear, means for resiliently holding the gear against said tangentially movable member, and means associated with said members for indicating the amount of relative movement between the contact member and the tangentially movable member.

5. A device of the class described comprising, a slidable unit having a member provided with a straight edge portion, oppositely spaced bearings on said mechanism, a contactor supported between said bearings and movable relatively with respect to said member, a lever fulcrumed on said slidable unit, a connection between said lever and said contact adjacent the fulcrum, a pair of dial indicators at the opposite sides of said lever for indicating the amount of relative movement between said contactor and said slidable unit.

6. In a device of the class described comprising a base portion, a pair of rollers carried by said base portion, a roller movable longitudinally with respect to said base portion, a bar between said first mentioned rollers and movable roller whereby lateral movement relative to said base is imparted to said bar upon rotation of said movable roller, means for supporting a gear on said movable roller with its pitch circle intersecting the tangent surface of said bar, a contactor mounted on said bar and movable with respect thereto in a plane parallel to the tangent surface of said bar adapted to engage a tooth of said gear, and means for indicating the amount of relative movement between said contactor and said bar.

7. A gear checking mechanism of the class described comprising, a rotatable gear support, a member having a straight surface tangent to the pitch diameter of a gear on said support, means for rotating said gear support and moving said member tangentially with respect to said gear support, a second member carried by said member and relatively movable with respect thereto, a contact member detachably secured to said second member and having a surface equal to the pressure angle of the gear teeth and adapted to engage the face of one of the teeth on the gear to be checked, and means for indicating the amount of relative movement between the relatively movable members.

FRANCIS T. SWAIN.